Patented Aug. 27, 1946

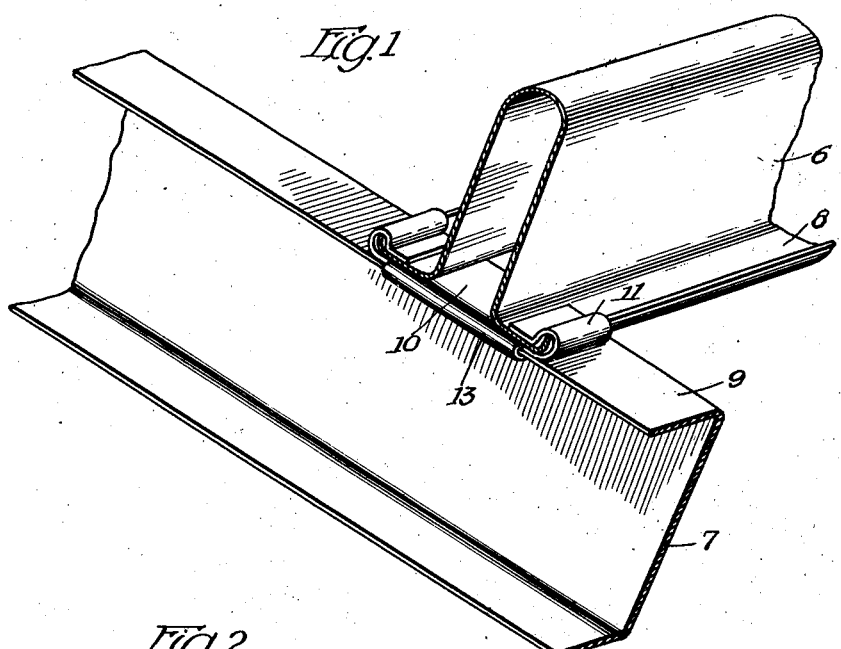
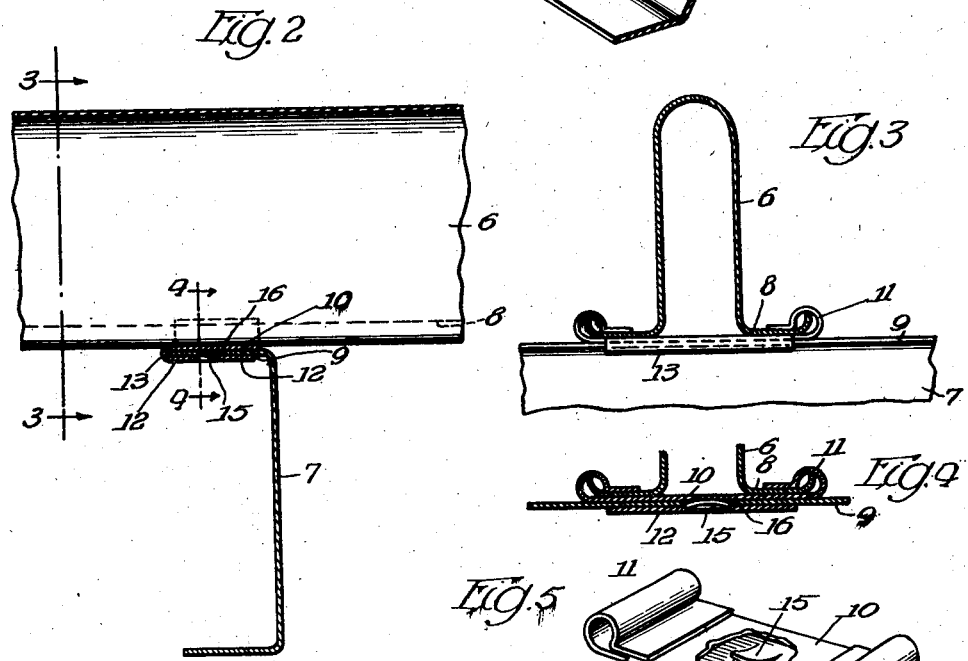

2,406,315

UNITED STATES PATENT OFFICE 2,406,315

CLIP

Ora G. Blocher, Wayne, Mich., assignor, by mesne assignments, to Consolidated Vultee Aircraft Corporation, a corporation of Delaware Application January 6, 1943, Serial No. 471,401

4 Claims. (Cl. 189—35)

The present invention relates generally to clips. More particularly the invention relates to that type of clip which has special use or utility in the manufacture of aircraft and serves as a medium for connecting together a pair of intersecting or crossing flanged structural elements.

One object of the invention is to provide a clip of this type which is of simple and novel construction and is characterized by the fact that it may be applied with facility and permits the structural elements to which it is applied to be quickly and accurately aligned.

Another object of the invention is to provide a clip which is especially designed to connect or secure together a hat section type stringer on, and in intersecting relation with, a flanged fairing strip and comprises (1) a flat elongated body part which is adapted to fit between the flanges of the stringer and the flange of the fairing strip and has at the ends thereof opposed inwardly facing hooks for surrounding and gripping the stringer flanges, and (2) a tab which is joined to one of the side margins of the body part, is arranged beneath, and in spaced parallel relation with, the body part, is adapted to underlie the flange of the fairing strip, and has an upstruck resilient tongue for interlocking with a hole in the fairing strip flange.

A further object of the invention is to provide a clip of the type and character under consideration which is in the form of a one-piece sheet metal stamping, may be produced at a low and reasonable cost and effectively and efficiently fulfills its intended purpose.

Other objects of the invention and the various advantages and characteristics of the present clip will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective showing a clip embodying the invention in use with a hat section type stringer and a flanged fairing strip;

Figure 2 is a vertical transverse section of the clip illustrating the manner in which the upstruck resilient tongue on the tab interlocks with the hole in the flange of the fairing strip to prevent displacement of the clip relatively to the fairing strip flange;

Figure 3 is a vertical section taken on the line 3—3 of Figure 2 and showing the manner in which the opposed hooks at the ends of the body part of the clip surround and grip the side flanges of the hat section type stringer;

Figure 4 is a vertical longitudinal section on the line 4—4 of Figure 2; and

Figure 5 is a perspective of the improved clip, a portion of the body part being broken away in order to show the arrangement and design of the upstruck tongue on the tab beneath the body part.

The clip which is shown in the drawing constitutes the preferred form or embodiment of the invention. It is in the form of a one-piece sheet metal stamping and serves as a medium for connecting or securing together a hat section type stringer 6 and a fairing strip 7. The stringer and fairing strip are of the types that are used in the production or fabrication of aircraft and are shown in the drawing as crossing or intersecting one another. The stringer 6 is located above, and disposed at right angles to, the fairing strip and has along the lower margin thereof a pair of outwardly extending, substantially coplanar flanges 8. The latter extend from one end of the stringer to the other and have upturned outer margins for reenforcing purposes. The fairing strip 7 has along the upper margin thereof a forwardly extending right angle flange 9, and this underlies the side flanges 8 of the hat section type stringer 6, as shown in Figures 1 to 4, inclusive.

The clip comprises a flat rectangular body part 10, a pair of opposed hooks 11 at the ends of the body part, and a tab 12 beneath the body part. The body part is adapted to be interposed between the fairing strip flange 9 and the side flanges 8 of the stringer 6 and preferably is the same in width as the fairing strip flange. It is adapted to extend lengthwise of the fairing strip flange 9 and corresponds in length to the distance between the upturned outer margins of the side flanges of the stringer. The hooks 11 are disposed at the top of the body part and face one another. They are adapted to surround and grip the side flanges of the hat section type stringer 6 and are preferably formed by providing extensions at the ends of the body part 10 and then bending such extensions upwards, then inwards, then downwards and then inwards in order that the hooks have tubular or loop-like outer portions and flat inner portions in substantially parallel relation with the body part 10. The tubular or loop-like outer portions of the hooks 11 are substantially ¾ round and are so dimensioned or proportioned that they accommodate the upturned outer margins of the side flanges of the stringer 6. The flat inner portions of the hooks are adapted to bear against the top faces of the central portions of the stringer side flanges 8 and are so spaced from the body part 10 of the clip that when the clip is in its operative position they exert downward spring pressure on the stringer side flanges and urge such flanges into tight or firm engagement with the end portions of the body part 10.

The tab 12 underlies, and is in spaced and parallel relation with the body part 10 of the clip and is adapted to fit against the under face of the flange 9 of the fairing strip 7. It is the same in width as the body part 10, and is joined to the front side margin of the latter by way of a U-shaped connecting part 13. The latter extends from one end of the tab 12 to the other end and forms a depending stop shoulder for limiting or restricting rearward movement of the clip relatively to the fairing strip 9. The central portion of the tab 12 is provided with a U-shaped slit 14 and this is arranged so that the ends thereof project away from the connecting part 13 between the tab and the body part 10. The metal within the slit 14 is deflected or struck upwards so as to form a resilient tongue 15. The latter is adapted to fit within, and become snugly interlocked with, a hole 16 in the fairing strip flange 9 when the clip is in its operative position. As shown in Figure 2, the hole 16 is disposed midway between the edges of the flange 9 and is circular, and the free end of the tongue 15 is semi-circular and is curved conformably to the hole so that it fits snugly therein when the clip is in its operative position.

In connection with application the clip is slid onto one end of the hat section type stringer 6. In mounting the clip on the stringer the tubular outer portions of the hooks 11 are aligned with the upturned outer margins of the side flanges of the stringer and the clip is then shifted towards the stringer 6. This manipulation results in the clip being slidably connected to the stringer and positioned so that the body part 10 underlies the flanges 8 and the hooks 11 are in hooked relation with such flanges. After applying the clip to the stringer the clip is shifted along the stringer until it approaches the fairing strip 7. When the clip approaches the fairing strip and is further slid along the stringer the tab 12 slides under the bottom face of the fairing strip flange 9 until the U-shaped connecting part 13 strikes against the outer or front edge of the flange. During rearward sliding movement of the tab relatively to the flange 9 the tongue 15 is depressed until it registers with the hole 16. As soon as the tongue registers with the hole it snaps upwards into interlocked relation with the hole defining portion of the fairing strip flange 9. When said tongue and hole defining portion are in interlocked relation the clip is effectively held against sliding movement relatively to the stringer 6 and displacement with respect to the fairing strip 7.

The herein described clip is essentially simple in design and construction and may be applied with facility. It serves, when in place, as a permanent connection or attachment between the structural elements to which it is applied and is capable of being manufactured or produced at an extremely low cost because it is in the form of a one-piece sheet metal stamping.

Whereas the clip has been described as being primarily or principally designed for use in connection with a hat section type stringer and a flanged fairing strip it is to be understood that it may be used in connection with other flanged types of structural elements. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A clip designed to connect a structural element having along one margin thereof an outwardly extending flange with a hole therein intermediate the side margins thereof and a second elongated structural element extending across the first mentioned element and having a pair of oppositely extending side flanges adjacent the flange of said first mentioned element, and comprising an elongated body part adapted to fit between the flange of said first mentioned element and the side flanges of the second element and having at its ends and adjacent one face thereof a pair of opposed inwardly extending preformed hooks for surrounding, gripping and slidably receiving the side flanges of said second element, and also having along one side margin and adjacent its other face a shoulder for engaging the edge of the flange of said first mentioned element, and an angularly disposed tongue positioned adjacent said other face of the body part, extending in the direction of the shoulder, having the end thereof nearer the shoulder free and shaped substantially conformably to the hole, and adapted to extend into said hole and also cooperate with the shoulder in such manner as to hold the clip in substantially rigidly connected relation with the flange of said first mentioned element, the other side margin of the body part being free or unencumbered in order to permit of ready application of said body part, shoulder and tongue to the flange of said first mentioned element by sliding of the clip relatively to said flange.

2. A one-piece sheet metal clip designed to connect an elongated structural element having along one margin thereof a flange with a hole therein, and a second elongated structural element extending transversely across the first mentioned element and having a pair of oppositely extending side flanges adjacent the flange of said first mentioned element, and comprising an elongated body part adapted to fit between the flange of said first mentioned element and the side flanges of the second element and having at its ends and adjacent one face thereof a pair of opposed inwardly extending preformed hooks for surrounding, gripping, and slidably receiving the side flanges of said second element, and a preformed tab in spaced parallel relation with the other face of the body part, connected to one of the side margins of the body part by a U-shaped connecting part forming a shoulder for engaging the edge of the flange of said first mentioned element, adapted to underlie and engage the flange of the first mentioned element and provided with an instruck resilient tongue extending towards the body part and in the direction of the connecting part and having its free end shaped substantially conformably to the hole and adapted when the clip is slid in the direction of said first mentioned element in order to bring the body part and tab into their operative position with respect to the flange of said first mentioned element to snap into and interlock with said hole and to coact with the shoulder forming U-shaped connecting part in such manner as substantially rigidly to connect the clip to said first mentioned element, the other side margin of said body part being free or unencumbered in order to permit of ready sliding of the clip into place.

3. A clip designed to connect an elongated structural element having along one margin thereof a flange with a hole therein and a hat section type stringer extending transversely across the element and having a pair of oppositely extending side flanges adjacent the flange of the element, and comprising an elongated body part adapted to fit between the flange of said element and the side flanges of the stringer, a pair of opposed inwardly extending preformed hooks adjacent one face of the body part connected to, and extending inwards from, the ends of said body part, adapted to surround, grip and slidably receive said flanges of the stringer and having the inner portions thereof flat and in parallel relation with the body part and their outer portions in the form of enlarged substantially three-quarter round loops, a shoulder forming part adjacent the other face of the body part connected to, and extending along, one side margin of said body part and adapted flatly to engage the edge of the flange of the element, and an angularly disposed tongue positioned adjacent said other face of the body part, extending in the direction of the shoulder forming part, having the end thereof nearer said shoulder forming part free and shaped substantially conformably to the hole, and adapted to extend into said hole and also cooperate with the shoulder in such manner as to hold the clip in substantially rigidly connected relation with the flange of the element, the other side margin of the body being free or unencumbered in order to permit of ready application of said body part, shoulder and tongue to the flange of said element by sliding of the clip relatively to the last mentioned flange.

4. A clip designed to connect an elongated structural element having along one margin thereof a flange with a hole therein and a hat section type stringer extending transversely across the element and having a pair of oppositely extending side flanges adjacent the flange of the element, and comprising an elongated body part adapted to fit between the flange of said element and the side flanges of the stringer, a pair of opposed inwardly extending preformed hooks adjacent one face of the body part connected to, and extending inwards from, the ends of said body part, adapted to surround, grip, and slidably receive said flanges of the stringer and having the inner portions thereof flat and in parallel relation with the body part and their outer portions in the form of enlarged substantially three-quarter round loops, and a preformed tab in spaced parallel relation with the other face of the body part, connected to one of the side margins of the body part by a U-shaped connecting part forming a shoulder for engaging the edge of the flange of the element, adapted to underlie and engage the flange of said element and provided with an instruck resilient tongue extending towards the body part and in the direction of the connecting part and having the free end shaped substantially conformably to the hole and adapted when the clip is slid in the direction of the element in order to bring the body part and tab into their operative position with respect to the flange of the element to snap into and interlock with said hole and to coact with the shoulder forming U-shaped connecting part in such manner as substantially rigidly to connect the clip to said element, the other side margin of the body part being free or unencumbered in order to permit of ready sliding of the clip into place.

ORA G. BLOCHER.